US012644584B2

(12) United States Patent
DaSilva

(10) Patent No.: US 12,644,584 B2
(45) Date of Patent: Jun. 2, 2026

(54) LED SHOP LIGHT

(71) Applicant: John DaSilva, Melbourne, FL (US)

(72) Inventor: John DaSilva, Melbourne, FL (US)

( * ) Notice: Subject to any disclaimer, the term of this patent is extended or adjusted under 35 U.S.C. 154(b) by 0 days.

(21) Appl. No.: 18/973,804

(22) Filed: Dec. 9, 2024

(65) Prior Publication Data

US 2025/0102135 A1 Mar. 27, 2025

Related U.S. Application Data

(60) Provisional application No. 63/687,816, filed on Aug. 28, 2024.

(51) Int. Cl.

| | |
|---|---|
| ***F21V 21/088*** | (2006.01) |
| ***F21S 2/00*** | (2016.01) |
| ***F21S 4/28*** | (2016.01) |
| ***F21V 23/00*** | (2015.01) |
| *F21Y 103/10* | (2016.01) |
| *F21Y 115/10* | (2016.01) |

(52) U.S. Cl.

CPC ............ *F21V 21/088* (2013.01); *F21S 2/005* (2013.01); *F21S 4/28* (2016.01); *F21V 23/001* (2013.01); *F21Y 2103/10* (2016.08); *F21Y 2115/10* (2016.08)

(58) Field of Classification Search

CPC ...... F21V 21/088; F21V 23/001; F21S 2/005; F21S 4/28; F21Y 2103/10

See application file for complete search history.

(56) References Cited

U.S. PATENT DOCUMENTS

| | | | | |
|---|---|---|---|---|
| 5,711,594 A | | 1/1998 | Hay | |
| 6,234,645 B1 | | 5/2001 | Borner | |
| 8,714,772 B1 | | 5/2014 | Levante | |
| 8,714,787 B2 | * | 5/2014 | McGehee | F21K 9/20 362/147 |
| 9,423,116 B2 | * | 8/2016 | Sieberth | F21S 4/28 |
| 2001/0024368 A1 | * | 9/2001 | Henrici | H01R 13/41 362/249.02 |
| 2004/0037079 A1 | | 2/2004 | Luk | |
| 2009/0303712 A1 | * | 12/2009 | Wung | F21V 19/003 362/234 |
| 2010/0097791 A1 | | 4/2010 | Chang | |
| 2011/0286207 A1 | * | 11/2011 | Chan | F21V 15/013 362/217.1 |
| 2013/0249404 A1 | * | 9/2013 | Eckel | H05B 47/1985 315/113 |

(Continued)

*Primary Examiner* — Evan P Dzierzynski

(74) *Attorney, Agent, or Firm* — Brennan, Manna & Diamond, LLC

(57) ABSTRACT

The LED shop light device is a modular lighting device to allow for variable lighting levels in a space. The LED shop light device comprises a substantially continuous array of LED's which form a module. This continuous array allows for substantially uniform light output from the LED light fixture. The LED modules can interface with one another via one or more electrical connectors, which allow two or more LED modules to be electrically coupled together. Also, the LED shop light device provides for clips to mechanically attach LED modules together and screws which allow the multiple modules to be attached to a wall or ceiling. Further, the LED shop light device can be powered via a power cord plugged into a wall, connected to an electrical box, or plugged into a light socket in a ceiling via an adaptor.

9 Claims, 3 Drawing Sheets

(56) References Cited

U.S. PATENT DOCUMENTS

| | | | | |
|---|---|---|---|---|
| 2014/0167632 | A1 | 6/2014 | Pijlman | |
| 2017/0276332 | A1* | 9/2017 | Pearson | F21V 21/005 |
| 2018/0003351 | A1* | 1/2018 | Van Winkle | F21V 23/001 |
| 2018/0080637 | A1* | 3/2018 | Didone' | F21S 8/033 |

* cited by examiner

LED SHOP LIGHT

CROSS-REFERENCE TO RELATED APPLICATION

The present application claims priority to, and the benefit of, U.S. Provisional Application No. 63/583,958, which was filed on Aug. 28, 2024, and is incorporated herein by reference in its entirety.

FIELD OF THE INVENTION

The present invention relates generally to the field of LED shop light devices. More specifically, the present invention relates to an LED shop light device for a modular and efficient way to light a space. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to an improvement in LED shop light devices. Generally, LED light units can be used in place of traditional fluorescent fixtures to offer more efficient lighting. Standard fixtures may require people to replace the ballast due to the ballast getting rusty and unsanitary. Further, fluorescent bulbs are filled with toxic gas, which makes them unsafe. Accordingly, LED lights may offer better energy efficiency in well-lit areas.

Generally, a linear light emitting diode ("LED") light fixture includes LED modules that interface with one another to provide a substantially continuous array of LED's. This continuous array allows for substantially uniform light output from the LED light fixture. However, sometimes the light fixture does not provide enough light for the room or area. There would be a need for multiple LED light fixtures that can be easily connected together for use.

Accordingly, there is a demand for an improved LED shop light device that can modularly increase the light level of a space. More particularly, there is a demand for a device which can add or subtract lighting modules with the use of clips to attach lighting modules together, as needed.

Therefore, there exists a long-felt need in the art for an LED shop light device that provides users with LED lights and a mounting system for improving the illumination in a room. There is also a long-felt need in the art for an LED shop light device that features a simple clip to attach LED modules together and can mount to a wall or ceiling. Further, there is a long-felt need in the art to allow users to connect two or more light units in one application to create a bright, well-lit appearance. There is also a need for an LED shop light device that offers easy and convenient light installation in homes, garages, offices, warehouses, and much more.

The subject matter disclosed and claimed herein, in one embodiment thereof, comprises an LED shop light device. The device is a modular lighting device to allow for variable lighting levels in an area, space, or room. The LED shop light device comprises a substantially continuous array of LED's in an LED module. This continuous array allows for substantially uniform light output from the LED light fixture. The LED modules can interface with one another via one or more electrical connectors, which allow two or more LED modules to be electrically coupled together. Also, the LED shop light device provides for clips to mechanically attach the LED modules together and screws which allow the multiple modules to be attached to a wall or ceiling. Further, the LED shop light device can be powered via a power cord plugged into a wall, connected to an electrical box, or plugged into a light socket in a ceiling via an adaptor.

In this manner, the LED shop light device of the present invention accomplishes all of the foregoing objectives and provides users with a device that can connect modular light fixtures together electrically and mechanically for variable lighting levels in a space. For example, the LED shop light device uses clips to mechanically connect multiple lighting modules together and screws for securing the device to a wall or surface, as needed.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an LED shop light device. The device is a modular lighting device to allow for variable lighting levels in a space, area, room, etc. The LED shop light device comprises a substantially continuous array of LED's incorporated into a plurality of LED modules. This continuous array allows for substantially uniform light output from the LED light module. The LED modules can interface with one another via one or more electrical connectors, which allow two or more LED modules to be electrically coupled together. Also, the LED shop light device provides for clips to mechanically attach LED modules together and screws allow the multiple modules to be attached to a wall or ceiling. Further, the LED shop light device can be powered via a power cord plugged into a wall, connected to an electrical box, or plugged into a light socket in a ceiling via an adaptor.

In one embodiment, the LED shop light device comprises a plurality of LED modules with each module having a front surface, back surface, top surface, bottom surface, and opposing left and right surfaces. The LED modules can be any suitable shape and size as is known in the art but in this embodiment, the LED modules are typically rectangular. Further, the LED modules encase at least one linear strand of LED lights, which are secured on a PC board. The PC board would comprise the mounted LED's, as well as the power supply and wires to connect multiple PC boards together. Any suitable number of linear strands of LED lights can be utilized as is known in the art. Additionally, the front surface comprises a transparent surface, such that the linear strand of LED lights can be seen through the surface, to allow light to be emitted and illuminate an area.

In one embodiment, either or both of the opposing right and left surfaces of the LED modules comprise electrical connectors which act to electrically connect the LED modules together, during use. In this embodiment, the electrical connectors are electrical plugs which provide a means to electrically connect one LED module to another, but any other suitable electrical connectors can be utilized, as is known in the art, such as a magnetic connection, a hardline connection, etc. Further, any suitable number of LED modules can be utilized and connected together as is known in the art, depending on the needs and/or wants of a user and the size of the room or area to be illuminated. Accordingly, the LED modules can be plugged in with an electrical power cord, wired to an electrical box, or plugged into a light socket in a ceiling via an adapter.

In one embodiment, the left surface of the LED modules can include an electrical connector and the opposing right surface of the LED module can include a corresponding receptacle for the electrical connector, or the electrical connector and receptacle can be switched from left to right surfaces. Thus, the LED modules may be connected end-to-end, with each electrical connector being disposed in its corresponding receptacle. Because the electrical connectors extend from the opposing right and left surfaces of the LED modules, and not from the interfacing top and bottom surfaces of the LED modules, the LED modules can engage one another without any significant gaps between the LED modules or between the pattern of LED's on the LED modules. Thus, the LED modules can provide a substantially continuous array or pattern of LED's across the LED modules in a continuous linear configuration. As set forth above, in alternative embodiments, each electrical connector may be coupled to its corresponding LED modules at any other suitable location, as well.

In one embodiment, the LED shop light device comprises at least one clip to mechanically attach the LED modules together to allow for variable light output. The clips generally are comprised of two spring holding clips and a connecting clip. The spring holding clips are generally rectangular in shape having opposing first and second ends. The first end of the spring holding clip is attached to the top surface of the LED module and the opposing second end is attached to the bottom surface of the LED module. The spring holding clip has an attachment feature in the center for receiving a screw or other suitable fastener. The attachment feature allows the spring holding clip to be secured to the connecting clip. The connecting clip is generally rectangular in shape and has opposing ends with an attachment feature at each end and in the middle or center. The connecting clip can be bent in an arch to allow for a fastener to be placed in the center attachment feature of the connecting clip. Further, the attachment features on the opposing ends would be lined up with the attachment features on the spring holding clip, to secure the connecting clip to the spring holding clips. Additionally, the spring holding clips can be attached to the connecting clip using screws, pins, welds, or any other suitable attachment means known in the art. Generally, the clips would be attached to the back surfaces of adjacent LED modules, to couple multiple LED modules together mechanically. Typically, the spring holding clips and the connecting clips would be manufactured from spring steel, aluminum, stainless steel, or any other suitable material known in the art.

In one embodiment, the clips may be manipulated to mount or remove the LED module. For example, pushing the ends of the spring holding clips apart from one another can separate the clips from the LED module, releasing the LED module from the clips. Similarly, the LED module may be mounted to the spring holding clips by sliding the LED module between the ends, and releasing the ends so that they engage the top and bottom surfaces of the LED module. Once the spring holding clips are secured to the LED modules, the spring holding clips are connected together via the connecting clip. Any suitable number of clips can be used to connect multiple LED modules together. Thus, the LED module is removably mounted and interchangeable in certain exemplary embodiments.

In one embodiment, the middle attachment feature of the connecting clip accepts a screw, pin, weld, or any other suitable attachment means known in the art, to secure the grouping of LED modules to a surface, such as a wall, floor, or ceiling for use.

In yet another embodiment, the LED shop light device comprises a plurality of indicia.

In yet another embodiment, a method of connecting LED modules for a brighter room appearance and to allow for variable light output is disclosed. The method includes the steps of providing a plurality of LED modules which are connected together. The method also comprises selecting the number of LED modules needed to adequately light a space. Further, the method comprises using spring holding clips to mechanically connect to the back surface of the LED module. Additionally, the method comprises using connecting clips connecting to the spring holding clips to mechanically connect the LED modules together. Further, the method comprises providing electrical connectors to electrically connect the LED modules together. Finally, the method comprises connecting the LED shop light device to a power supply for use.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
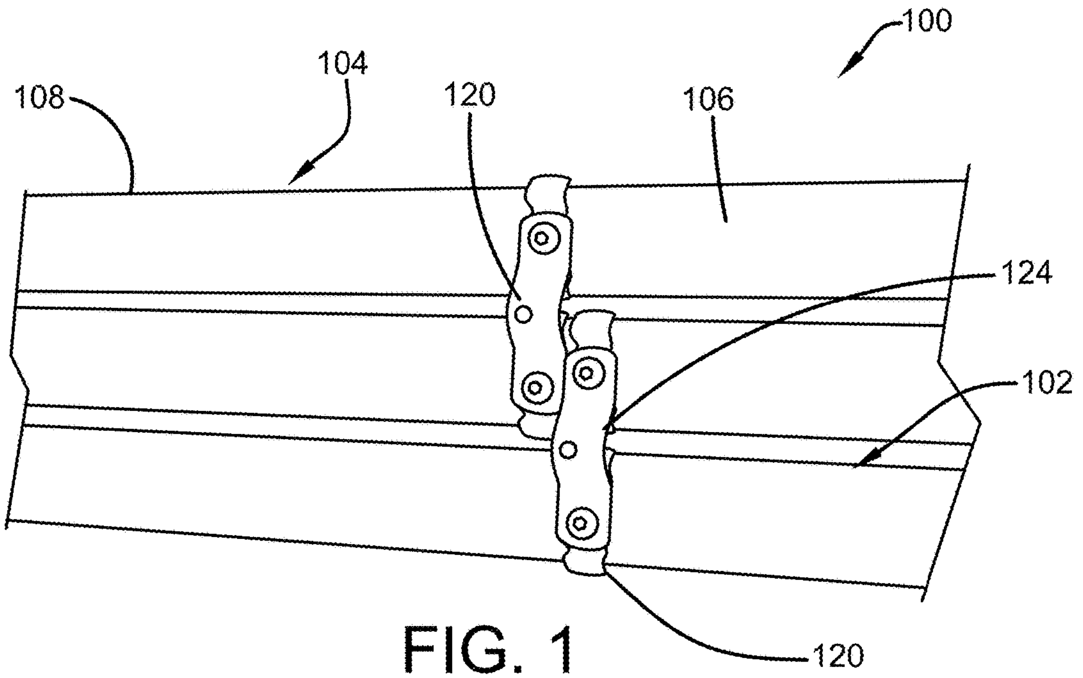
FIG. 1 illustrates a perspective view of one embodiment of the LED shop light device of the present invention showing the LED modules and the clips in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an LED shop light device that provides users with a means for lighting a space with a modular device of LED modules. There is also a long-felt need in the art for an LED shop light device that features a simple clip which attaches LED modules together, which mount to a wall or ceiling. Further, there is a long-felt need in the art for a LED shop light device that can expand with multiple light modules to increase light in a space.

The present invention, in one exemplary embodiment, is a novel LED shop light device. The device is a modular lighting device to allow for variable lighting levels in a space. The LED shop light device comprises a substantially continuous array of LED's which form a module. This continuous array allows for substantially uniform light output from the LED light fixture. The LED modules can interface with one another via one or more electrical connectors, which allow two or more LED modules to be electrically coupled together. Also, the LED shop light device provides for clips to mechanically attach the LED modules together and screws which allow the multiple modules to be attached to a wall or ceiling. Further, the LED shop light device can be powered via a power cord plugged into a wall, connected to an electrical box, or plugged into a light socket in a ceiling via an adaptor. The present invention also includes a novel method of connecting LED modules for a brighter room appearance and to allow for variable light output. The method includes the steps of providing a plurality of LED modules which are connected together. The method also comprises selecting the number of LED modules needed to adequately light a space. Further, the method comprises using spring holding clips to mechanically connect to the back surface of the LED module. Additionally, the method comprises using connecting clips connecting to the spring holding clips to mechanically connect the LED modules together. Further, the method comprises providing electrical connectors to electrically connect the LED modules together. Finally, the method comprises connecting the LED shop light device to a power supply for use.

Referring initially to the drawings, FIG. 1 illustrates a perspective view of one embodiment of the LED shop light device 100 of the present invention. In one embodiment, the LED shop light device 100 comprises a modular lighting device to allow for variable lighting levels in a space, area, room, etc. The LED shop light device 100 comprises a substantially continuous array of LED's incorporated into a plurality of LED modules 102. This continuous array allows for substantially uniform light output from the LED light module 102. The LED modules 102 can interface with one another via one or more electrical connectors 116, which allow two or more LED modules 102 to be electrically coupled together. Also, the LED shop light device 100 provides for clips 120 to mechanically attach LED modules 102 together and screws 126 allow the multiple modules 102 to be attached to a wall or ceiling 128. Further, the LED shop light device 100 can be powered via a power cord 118 plugged into a wall, connected to an electrical box, or plugged into a light socket in a ceiling via an adaptor, etc.

Generally, an LED light fixture includes LED modules 102 that interface with one another to provide a substantially continuous array of LED's. This continuous array allows for substantially uniform light output from the LED light fixture. The LED modules 102 can interface with one another via one or more electrical connectors 116 and clips 120, which allow two or more LED modules 102 to be electrically and mechanically coupled together. The clips 120 may be disposed beneath the LED's so that the clips 120 are not visible when the LED modules 102 are coupled together. Further, the connectors 116 may be disposed along opposite ends of the modules 102 to allow for end-to-end configurations of the modules 102 and/or alongside ends of the modules 102 to allow for angled or curved configurations of the modules 102. Further, the LED modules 102 can be powered via one or more wires, magnets, or clips, which are coupled to a power source.

Furthermore, the LED shop light device 100 comprises a plurality of LED modules 102 with each module 102 having a front surface 104, back surface 106, top surface 108, bottom surface 110, and opposing left 112 and right 114 surfaces. The LED modules 102 can be any suitable shape and size as is known in the art but in this embodiment, the LED modules 102 are typically rectangular. Further, the LED modules 102 encase at least one linear strand of LED lights 130, which are secured on a PC board (not shown). The PC board would comprise the mounted LED's 130, as well as the power supply and wires to connect multiple PC boards together. Any suitable number of linear strands of LED lights 130 can be utilized as is known in the art. Additionally, the front surface 104 comprises a transparent surface 132, such that the linear strand of LED lights 130 can be seen through the surface 132, to allow light to be emitted and illuminate an area.

Figure 2:
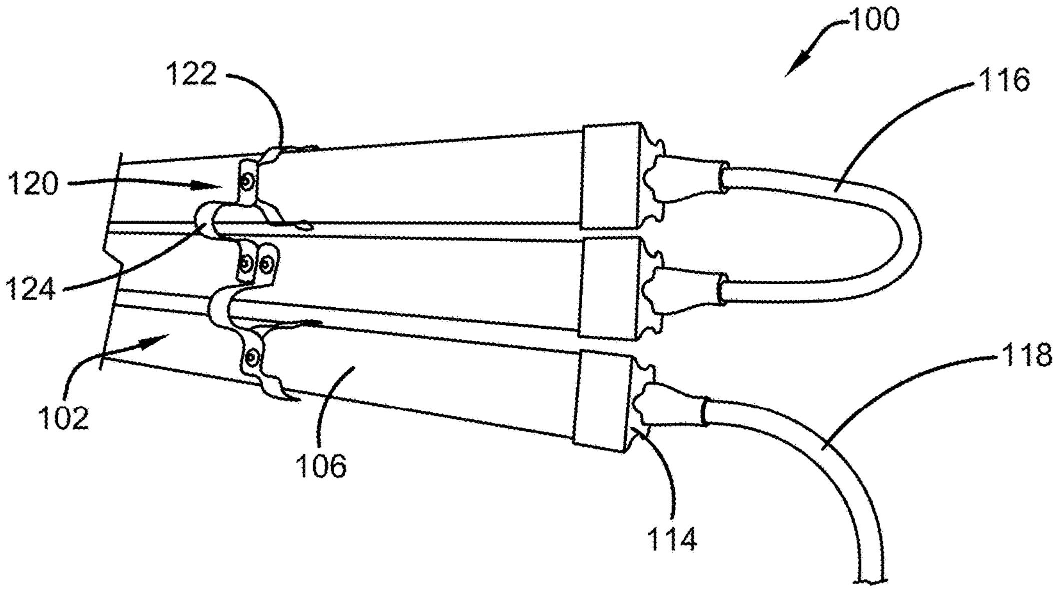
FIG. 2 illustrates an end perspective view of one embodiment of the LED shop light device of the present invention showing electrical connectors and clips in accordance with the disclosed architecture.

As shown in FIG. 2, either or both of the opposing right 104 and left 106 surfaces of the LED modules 102 comprise electrical connectors 116 which act to electrically connect the LED modules 102 together, during use. In this embodiment, the electrical connectors 116 are electrical plugs 118 which provide a means to electrically connect one LED module 102 to another, but any other suitable electrical connectors 116 can be utilized, as is known in the art, such as a magnetic connection, a hardline connection, etc. Further, any suitable number of LED modules 102 can be utilized and connected together as is known in the art, depending on the needs and/or wants of a user and the size of the room or area to be illuminated. Accordingly, the LED modules 102 can be plugged in with an electrical power cord 118, wired to an electrical box, or plugged into a light socket in a ceiling via an adapter.

In one embodiment, the left surface 112 of the LED modules 102 can include an electrical connector 116 and the opposing right surface 114 of the LED module 102 can include a corresponding receptacle 134 for the electrical connector 116, or the electrical connector 116 and receptacle 134 can be switched from left 112 to right 114 surfaces. Thus, the LED modules 102 may be connected end-to-end, with each electrical connector 116 being disposed in its corresponding receptacle 134. Because the electrical connectors 116 extend from the opposing right 114 and left 112 surfaces of the LED modules 102, and not from the interfacing top 108 and bottom 110 surfaces of the LED modules 102, the LED modules 102 can engage one another without any significant gaps between the LED modules 102 or between the pattern of LED's on the LED modules 102. Thus, the LED modules 102 can provide a substantially continuous array or pattern of LED's across the LED modules 102 in a continuous linear configuration. As set forth above, in alternative embodiments, each electrical connector 116 may be coupled to its corresponding LED modules 102 at any other suitable location, as well.

Figure 3:
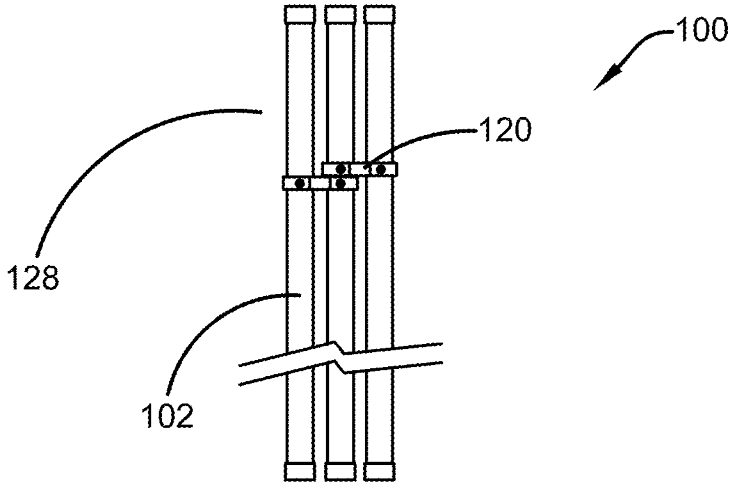
FIG. 3 illustrates a perspective view of one embodiment of the LED shop light device of the present invention showing how multiple LED modules can be assembled into a single fixture in accordance with the disclosed architecture.

As shown in FIG. 3, the LED shop light device 100 comprises at least one clip 120 to mechanically attach the LED modules 102 together to allow for variable light output. The clips 120 generally are comprised of two spring holding clips 122 and a connecting clip 124. The spring holding clips 122 are generally rectangular in shape having opposing first 136 and second 138 ends. The first end 136 of the spring holding clip 122 is attached to the top surface 108 of the LED module 102 and the opposing second end 138 is attached to the bottom surface 110 of the LED module 102. The spring holding clip 122 has an attachment feature 140 in the center for receiving a screw 126 or other suitable fastener. The attachment feature 140 allows the spring holding clip 122 to be secured to the connecting clip 124. The connecting clip 124 is generally rectangular in shape and has opposing ends 142 with an attachment feature 144 at each end 142 and in the middle or center 146. The connecting clip 124 can be bent in an arch to allow for a fastener (i.e., screw 126) to be placed in the center attachment feature 146 of the connecting clip 124. Further, the attachment features 144 on the opposing ends 142 would be lined up with the attachment features 140 on the spring holding clip 122, to secure the connecting clip 124 to the spring holding clips 122. Additionally, the spring holding clips 122 can be attached to the connecting clip 124 using screws 126, pins, welds, or any other suitable attachment means known in the art. Generally, the clips 120 would be attached to the back surfaces 106 of adjacent LED modules 102, to couple multiple LED modules 102 together mechanically. Typically, the spring holding clips 122 and the connecting clips 124 would be manufactured from spring steel, aluminum, stainless steel, or any other suitable material known in the art.

In one embodiment, the clips 120 can be a single piece that is extruded to include the needed features to mechanically connect the LED modules 102 together.

Figure 4:
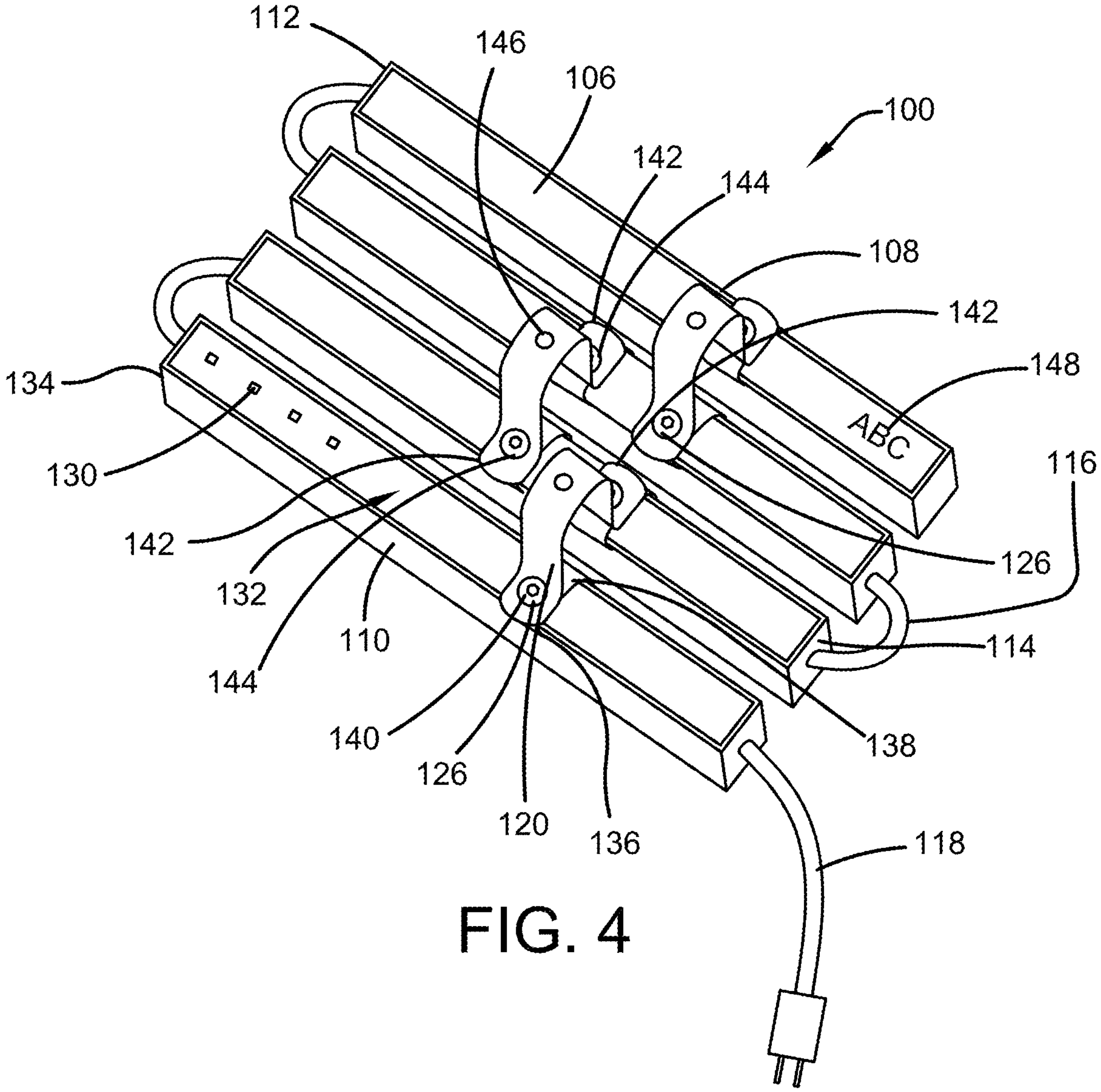
FIG. 4 illustrates a perspective view of one embodiment of the LED shop light device of the present invention showing how the LED modules connect together and connect to an electrical plug in accordance with the disclosed architecture.

As shown in FIG. 4, the clips 120 may be manipulated to mount or remove the LED module 102. For example, pushing the ends 136 and 138 of the spring holding clips 122 apart from one another can separate the clips 122 from the LED module 102, releasing the LED module 102 from the clips 122. Similarly, the LED module 102 may be mounted to the spring holding clips 122 by sliding the LED module 102 between the ends 136 and 138, and releasing the ends 136 and 138 so that they engage the top 108 and bottom 110 surfaces of the LED module 102. Once the spring holding clips 122 are secured to the LED modules 102, the spring holding clips 122 are connected together via the connecting clip 124. Any suitable number of clips 120 can be used to connect multiple LED modules 102 together. Thus, the LED module 102 is removably mounted and interchangeable in certain exemplary embodiments.

Furthermore, the middle attachment feature 146 of the connecting clip 124 accepts a screw 126, pin, weld, or any other suitable attachment means known in the art, to secure the grouping of LED modules 102 to a surface 128, such as a wall, floor, or ceiling for use.

In yet another embodiment, the LED shop light device 100 comprises a plurality of indicia 148. The LED module 102 of the device 100 may include advertising, a trademark, or other letters, designs, or characters, printed, painted, stamped, or integrated into the LED module 102, or any other indicia 148 as is known in the art. Specifically, any suitable indicia 148 as is known in the art can be included, such as, but not limited to, patterns, logos, emblems, images, symbols, designs, letters, words, characters, animals, advertisements, brands, etc., that may or may not be LED, shop light, or brand related.

Figure 5:
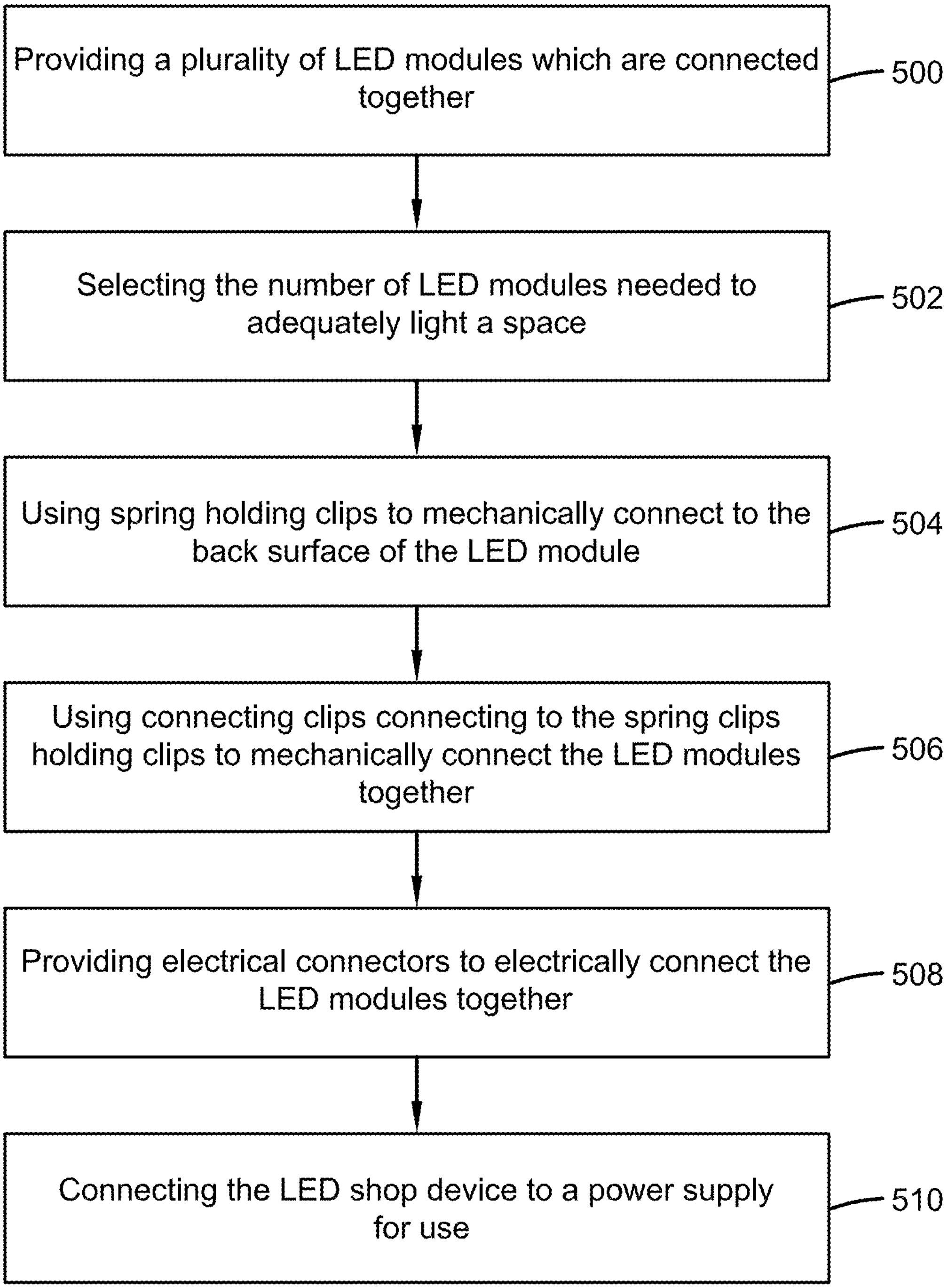
FIG. 5 illustrates a flowchart showing the method of connecting LED modules for a brighter room appearance and to allow for variable light output in accordance with the disclosed architecture.

FIG. 5 illustrates a flowchart of the method of connecting LED modules for a brighter room appearance and to allow for variable light output. The method includes the steps of at 500, providing a plurality of LED modules which are connected together. The method also comprises at 502, selecting the number of LED modules needed to adequately light a space. Further, the method comprises at 504, using spring holding clips to mechanically connect to the back surface of the LED module. Additionally, the method comprises at 506, using connecting clips connecting to the spring holding clips to mechanically connect the LED modules together. Further, the method comprises at 508, providing electrical connectors to electrically connect the LED modules together. Finally, the method comprises at 510, connecting the LED shop light device to a power supply for use.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "LED shop light device", "LED device", "shop light device", and "device" are interchangeable and refer to the LED shop light device 100 of the present invention.

Notwithstanding the foregoing, the LED shop light device 100 of the present invention can be of any suitable size and configuration as is known in the art without affecting the overall concept of the invention, provided that it accomplishes the above-stated objectives. One of ordinary skill in the art will appreciate that the LED shop light device 100 as shown in FIGS. 1-5 is for illustrative purposes only, and that many other sizes and shapes of the LED shop light device 100 are well within the scope of the present disclosure. Although the dimensions of the LED shop light device 100 are important design parameters for user convenience, the LED shop light device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A LED shop light device that allows for variable lighting levels in a space, the LED shop light device comprising:
- a plurality of LED modules;
- an electrical connector; and
- a clip;
- wherein the plurality of LED modules each comprise a substantially continuous array of LED's;
- wherein the plurality of LED modules can interface with one another via the electrical connector;
- wherein the clip attaches the plurality of LED modules together;
- wherein the attached plurality of LED modules are secured to a surface for use;
- wherein each of the plurality of LED modules comprise a front surface, a back surface, a top surface, a bottom surface, and opposing left and right surfaces;
- wherein the plurality of LED modules are rectangular in configuration;
- wherein each of the plurality of LED modules encase at least one linear strand of LED lights;
- wherein the front surface comprises a transparent surface, such that the at least one linear strand of LED lights can be seen through the transparent surface, to allow light to be emitted and illuminate an area;
- wherein either or both of the opposing left and right surfaces of the plurality of LED modules comprise electrical connectors which act to electrically connect the plurality of LED modules together during use;
- wherein the electrical connectors are electrical plugs which provide a means to electrically connect one of the plurality of LED modules to another;
- wherein the plurality of LED modules can be plugged in with an electrical power cord, wired to an electrical box, or plugged into a light socket in a ceiling via an adapter;
- wherein the left surface of the plurality of LED modules can include an electrical connector and the opposing right surface of the plurality of LED modules can include a corresponding receptacle for the electrical connector, such that the plurality of LED modules can be connected end-to-end, with each electrical connector being disposed in its corresponding receptacle;
- wherein the clip is comprised of two spring holding clips and a connecting clip; and
- further wherein the two spring holding clips are generally rectangular in shape having opposing first and second ends and an attachment feature in a center for receiving a screw.

2. The LED shop light device of claim 1, wherein the first end of the two spring holding clips are attached to the top surface of the plurality of LED modules and the opposing second end is attached to the bottom surface of the plurality of LED modules.

3. The LED shop light device of claim 2, wherein the connecting clip is generally rectangular in shape and has opposing ends with an attachment feature at each end and in a middle.

4. The LED shop light device of claim 3, wherein the connecting clip is bent in an arch to allow for a screw to be placed in the middle attachment feature and the opposing ends would be lined up with the attachment features on the two spring holding clip, to secure the connecting clip to the two spring holding clips.

5. A LED shop light device that allows for variable lighting levels in a space, the LED shop light device comprising:
- a plurality of LED modules each comprising a front surface, a back surface, a top surface, a bottom surface, and opposing left and right surfaces;
- an electrical connector; and
- a clip comprising two spring holding clips and a connecting clip;
- wherein the plurality of LED modules each comprise a substantially continuous array of LED's;
- wherein the front surface comprises a transparent surface, such that the at least one linear strand of LED lights can be seen through the transparent surface, to allow light to be emitted and illuminate an area;
- wherein either or both of the opposing left and right surfaces of the plurality of LED modules comprise electrical connectors which act to electrically connect the plurality of LED modules together during use;
- wherein the electrical connectors are electrical plugs which provide a means to electrically connect one of the plurality of LED modules to another;
- wherein the clip attaches the plurality of LED modules together;
- wherein the two spring holding clips are generally rectangular in shape having opposing first and second ends and an attachment feature in a center for receiving a screw;
- wherein the first end of the two spring holding clips are attached to the top surface of the plurality of LED modules and the opposing second end is attached to the bottom surface of the plurality of LED modules;
- wherein the connecting clip is generally rectangular in shape and has opposing ends with an attachment feature at each end and in a middle;
- wherein the connecting clip is bent in an arch to allow for a screw to be placed in the middle attachment feature and the opposing ends would be lined up with the attachment features on the two spring holding clip, to secure the connecting clip to the two spring holding clips; and
- further wherein the attached plurality of LED modules are secured to a surface for use.

6. The LED shop light device of claim 5, wherein the clip is attached to the back surfaces of the plurality of LED modules, to couple the plurality of LED modules together.

7. The LED shop light device of claim 5, wherein the clip is a single piece that is extruded to include needed features to mechanically connect the plurality of LED modules together.

8. The LED shop light device of claim 5 further comprising a plurality of indicia.

9. The LED shop light device of claim 5, wherein the left surface of the plurality of LED modules can include an electrical connector and the opposing right surface of the plurality of LED modules can include a corresponding receptacle for the electrical connector, such that the plurality of LED modules can be connected end-to-end, with each electrical connector being disposed in its corresponding receptacle.

* * * * *